United States Patent [19]

Visnapuu

[11] Patent Number: 4,632,471
[45] Date of Patent: Dec. 30, 1986

[54] COMPUTER VIDEO WORK STATION WITH COPYHOLDER

[76] Inventor: Andres H. Visnapuu, 2965 Scarborough, Cleveland Hts., Ohio 44118

[21] Appl. No.: 606,690

[22] Filed: May 3, 1984

[51] Int. Cl.$^4$ ............................................. A47B 97/02
[52] U.S. Cl. .................................. 312/233; 248/442.2; 312/7.2
[58] Field of Search ................. 312/233, 7.2; 248/447, 248/441.1, 442.2, 451, 452, 205.2, 287, 278, 279, 285, 286

[56] References Cited

U.S. PATENT DOCUMENTS

| | | | |
|---|---|---|---|
| 1,641,558 | 9/1927 | Streeper | 248/287 |
| 2,282,262 | 5/1942 | Steinberg | 312/233 |
| 2,794,697 | 6/1957 | Bergman | 312/233 |
| 2,870,985 | 1/1959 | Martin et al. | 248/278 |
| 3,415,300 | 12/1968 | Worcester | 248/205.2 |
| 4,037,895 | 7/1977 | Hedstrom et al. | 312/233 |
| 4,475,705 | 10/1984 | Henneberg et al. | 248/451 |

Primary Examiner—William E. Lyddane
Assistant Examiner—Joseph Falk
Attorney, Agent, or Firm—Renner, Otto, Boisselle & Lyon

[57] ABSTRACT

For use with a CRT monitor, a copyholder assembly comprises a copyholder including a display framing panel and at least one copyholding panel extending from a respective side of the display framing panel. The panels are joined either integrally or for pivotal angular adjustment of the copyholding panel relative to the display framing panel. The display framing panel, which includes a window positionable in front of the CRT screen, is adjustably detachably secured to a mounting assembly removably securable atop the monitor or to a mount removably securable beneath the monitor. The mounting assembly is adjustable for universal use with different monitors notwithstanding different top surface configurations. Optional accessories for the copyholder also are disclosed.

30 Claims, 22 Drawing Figures

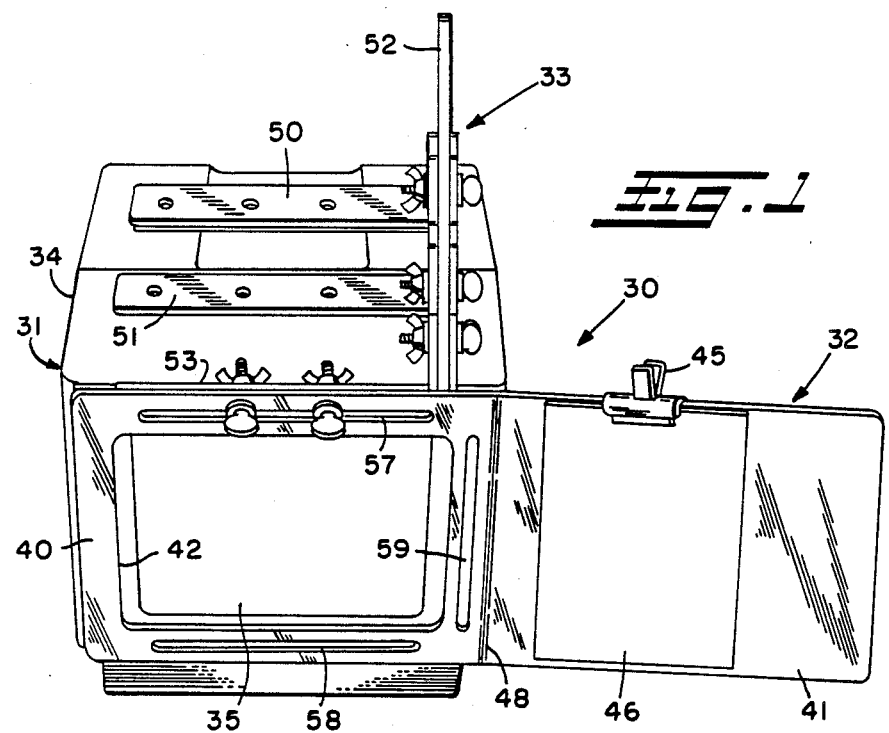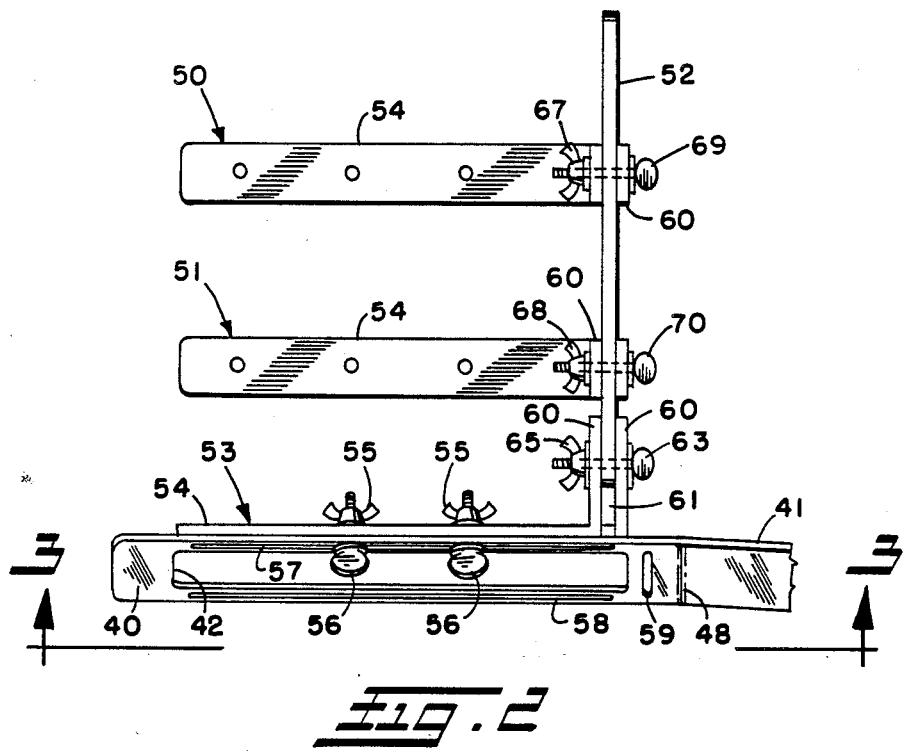

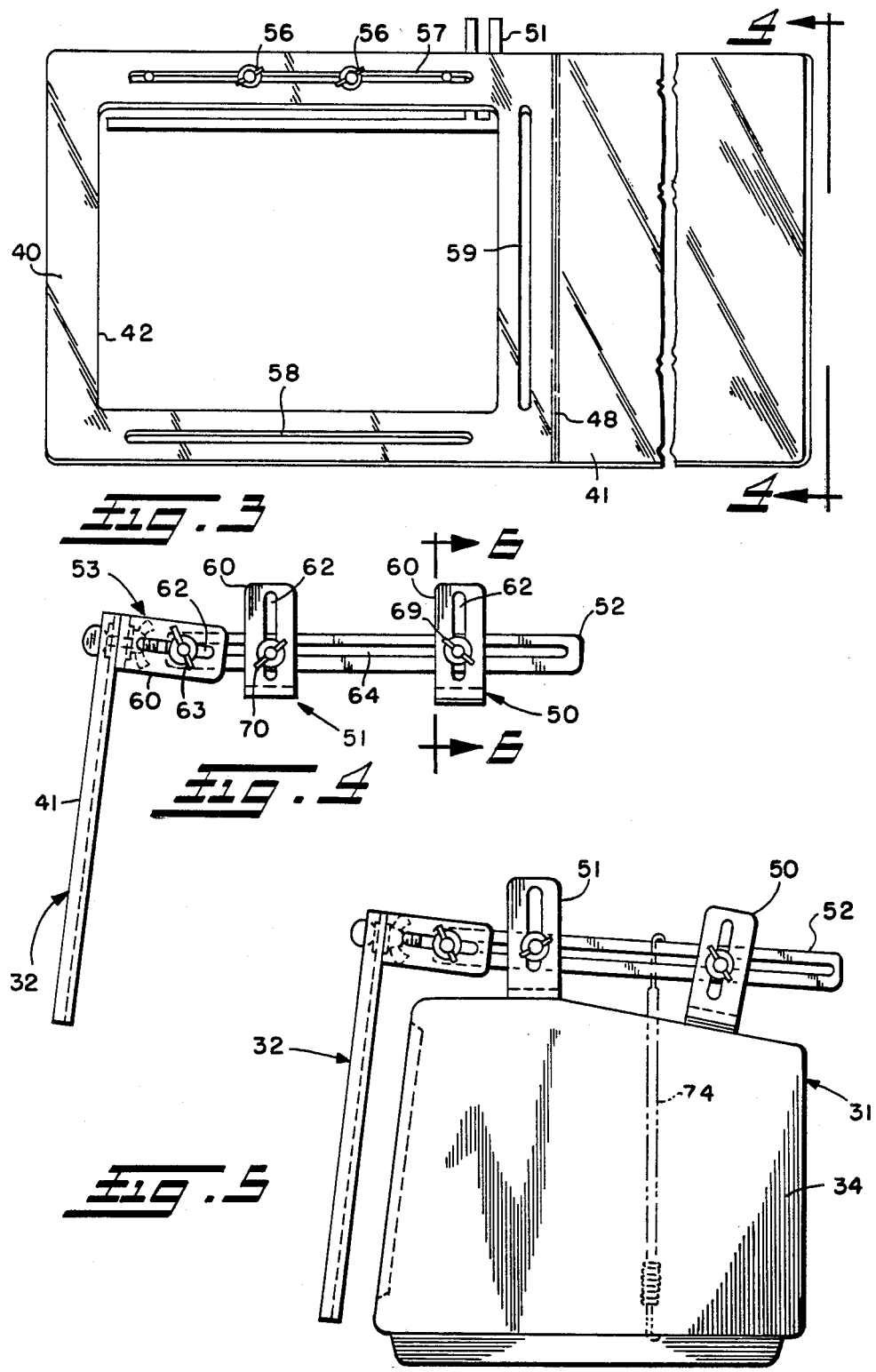

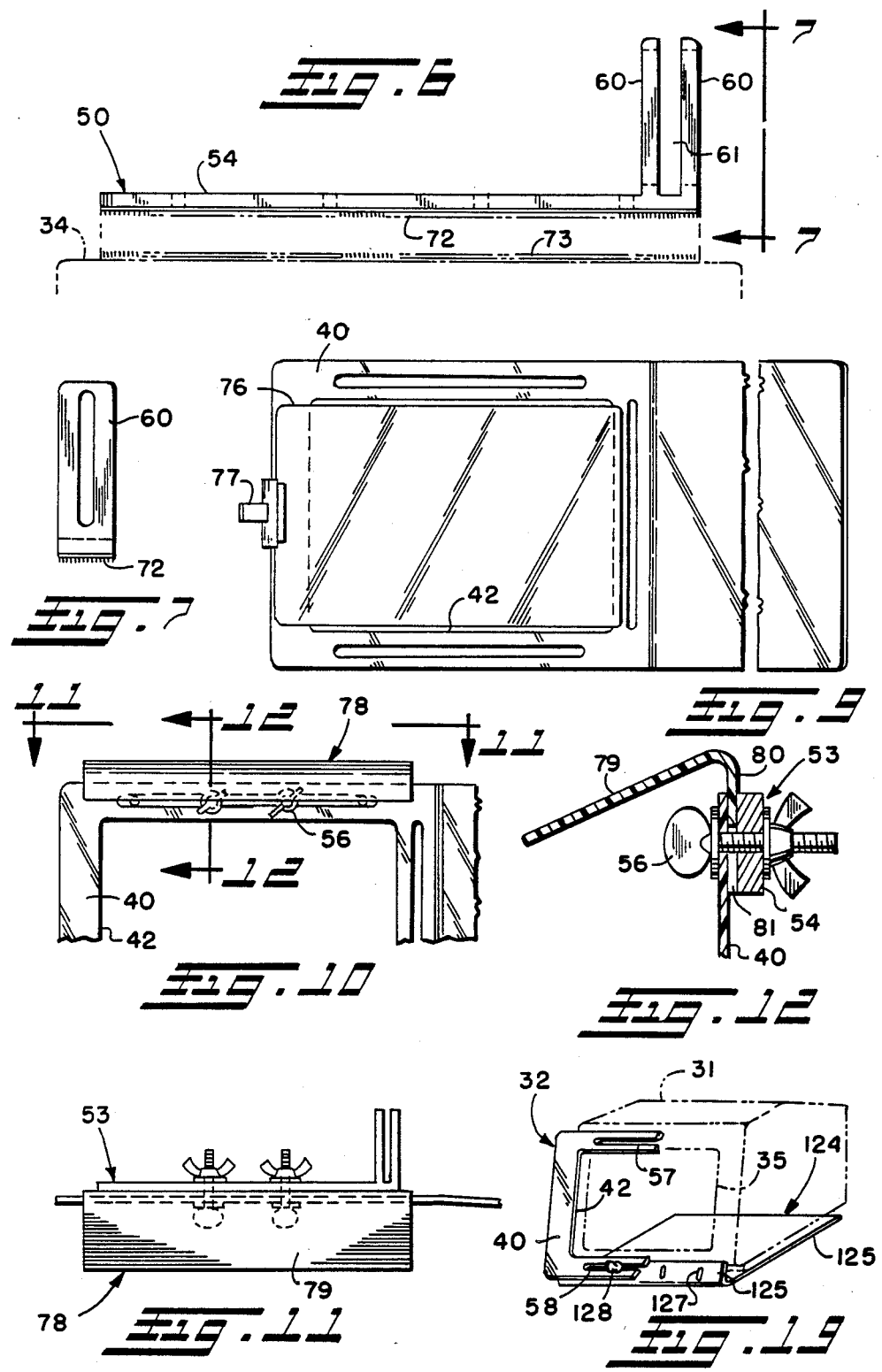

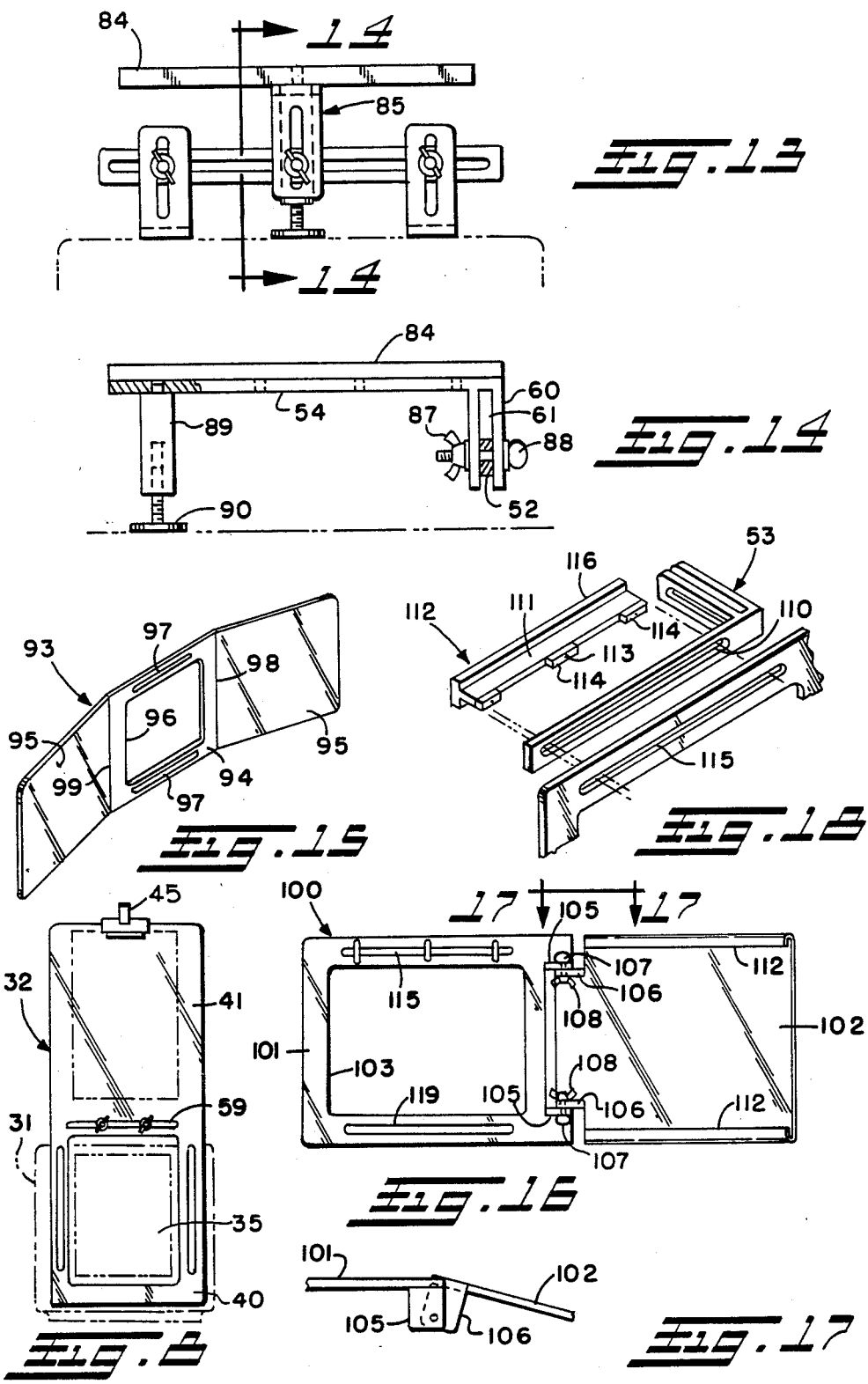

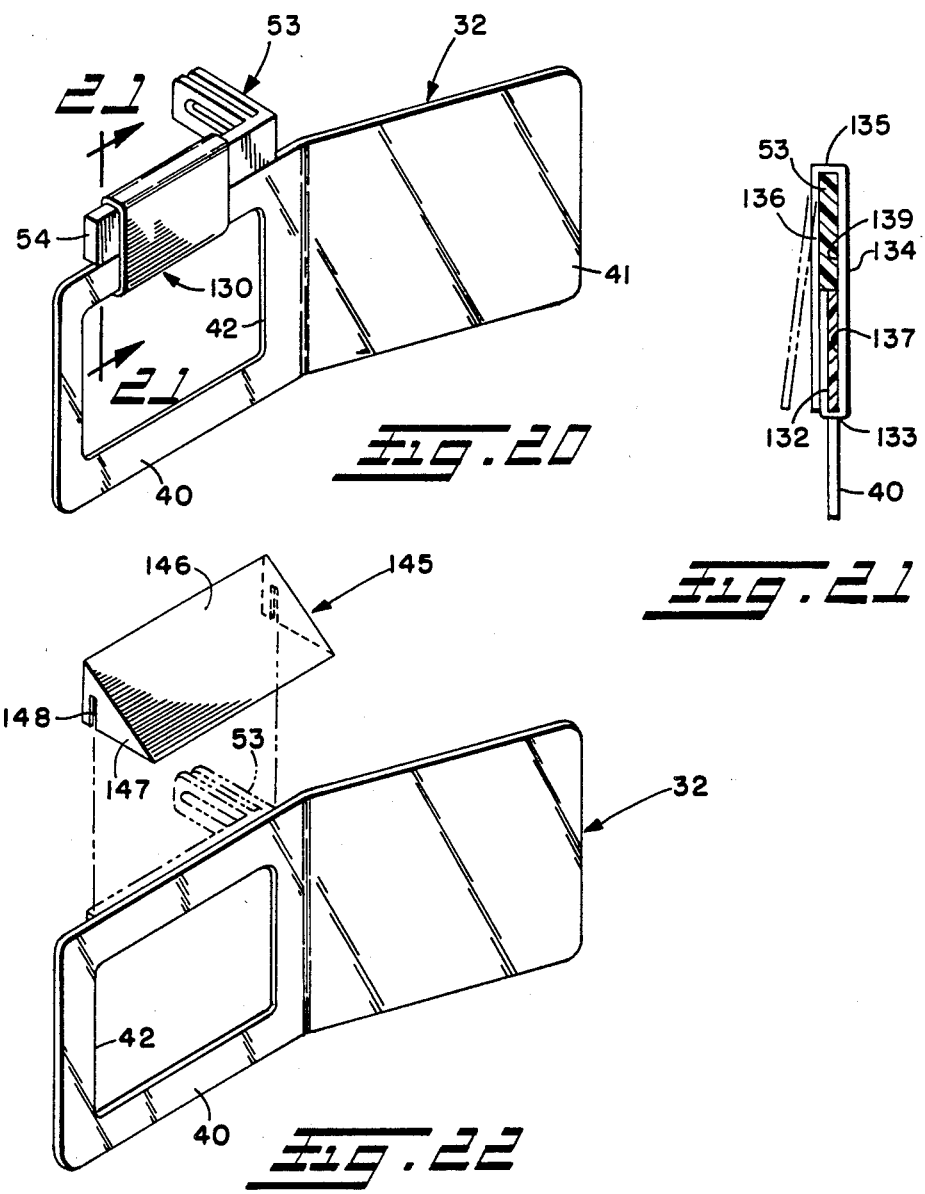

COMPUTER VIDEO WORK STATION WITH COPYHOLDER

DISCLOSURE

The invention herein described relates generally to computer video work stations and more particularly to a copyholder and universal mounting assembly for mounting the copyholder to any one of a variety of video (CRT) monitors.

BACKGROUND OF THE INVENTION

Typing copy stands have long been utilized by typists to hold copy material in generally vertical disposition to assist the typist. Such stands typically have a support base adapted to rest on a surface adjacent the typewriter to hold an inclined front surface generally upright for support of copy material. A typing copy stand of this general type is shown in U.S. Pat. No. 4,329,799.

Also known are copyholders designed to be mounted on a typewriter or secured in position by the typewriter. Examples of these general types of copyholders are shown in U.S. Pat. Nos. 1,203,354; 2,146,465; and 2,790,421.

As a result of advances in computer technology, word processors and microcomputers have become widely used. Such word processors and microcomputers utilize a cathode ray tube (CRT) monitor to display material entered at a keyboard positioned forwardly of the monitor. For ergonomical reasons, the CRT screen usually is elevated above and to the rear of the keyboard, and in modular systems, the monitor is often supported atop the main system unit or an elevated support surface of a stand positioned to the rear of the keyboard. A preferred monitor position is one wherein the CRT screen is slightly below the operator's eye level and slightly upwardly inclined to present its generally planar surface at right angles to the operator's line of sight.

Although typing copy stands of the above noted type can and have been utilized by operators of word processors and microcomputers, they do suffer several drawbacks particularly because of the elevated disposition and orientation of the CRT screen. On the other hand, copyholders designed to be mounted on a typewriter generally are not usable with the word processor or microcomputer because of their differing constructions and configurations.

One major drawback of typing copy stands is that the stand usually has to be positioned a considerable distance to one side of the CRT screen with the copy support surface at a lower elevation than the CRT screen. Consequently, operators must repeatedly move their heads and eyes back and forth as well as up and down between the supported copy and the CRT screen when entering data for display on the screen. This causes production to be slowed, the incidence of errors to be increased, and fatigue of the operators to be accelerated.

Another problem with conventional typing copy stands is that they require a larger task surface than might otherwise be needed and/or occupy task surface space that might be utilized for other purposes. This problem is accentuated when the operator has a need to view several items of copy material during data entry. This either requires a large typing copy stand occupying a corresponding larger amount of task surface space or multiple copy stands which not only consumes task surface space but also requires purchase of multiple stands for use at a single work station.

In U.S. Pat. No. 4,313,112, there is shown a computer work station assembly having provision for positioning copy material beneath the CRT screen and to the rear of the keyboard. One problem with such arrangement is that the plane of the copy material is at a rather severe angle to the plane of the CRT screen as well as at a significant acute angle to the line of sight of the operator. Moreover, a substantial portion of the copy material would be located considerably in front of the CRT screen which increases operator focus time. Such apparatus is also limited to a rather specific word processor or computer work station. For example, such unit cannot be used in conjunction with a typical system arrangement where the monitor is supported atop the system unit containing one or more disc drives which must be accessible to the operator.

SUMMARY OF THE INVENTION

In accordance with the present invention, a copyholder assembly is provided for advantageous use with a CRT monitor. The copyholder assembly comprises a copy support member for supporting copy material, a mount or mounting assembly supported by the monitor, and means for securing the copy support member to the front of the mount for offset suspension at one side of the mount for positioning of the copy support member directly adjacent one side of the CRT screen. This aspect of the invention provides for optimum positioning of copy material in relation to the CRT screen without the need for or consumption of task surface space. Instead, the copyholder is supported by a mounting assembly atop the monitor which typically is unused space or by a mount held beneath the monitor. Moreover, the mounting assembly is adjustable for use with monitors of different types and without modification of the monitor such as drilling holes, etc. The assembly also may support an optional table which may be adjusted level to render usable the space above the monitor.

According to another aspect of the invention, a copyholder for use with a CRT monitor comprises a display framing panel having a window positionable in front of the CRT screen to permit viewing of the screen through such window, and a copyholding panel joined to the display framing panel for extension from one side thereof, which copyholding panel has a front copy support surface. The window serves to eliminate distraction and to facilitate operator eye transition between the CRT screen and copy material supported on the copyholding panel. The copyholder may be removably secured in one of plural attachment modes to mounts supported by the monitor as well as by other types of mounts independently of the monitor, if desired. An alternative mount supported beneath the monitor also is provided. The copyholder supports copy material generally in the same plane of vision as the framed monitor to avoid repeated refocusing by the operator thereby to reduce stress and increase productivity. The copyholder also serves as a mount for optic means such as an anti-glare screen or magnifying lens.

Other features and advantages of the invention are hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 1 is a front perspective view of a copyholder assembly according to the invention, the assembly being shown mounted to a monitor in a preferred manner;

FIG. 2 is an enlarged top plan view of the copyholder assembly illustrated in FIG. 1;

FIG. 3 is a front elevational view of the copyholder assembly illustrated in FIG. 1 as viewed in the direction of the arrows 3—3 of FIG. 2;

FIG. 4 is a side elevational view of the copyholder assembly illustrated in FIG. 1 as viewed in the direction of the arrows 4—4 of FIG. 3;

FIG. 5 is a side elevational view similar to FIG. 4 but showing the copyholder assembly adjusted for use with the illustated monitor;

FIG. 6 is a sectional taken along the line 6—6 of FIG. 4 with parts removed to illustrate in detail a preferred modular bracket utilized in the mounting assembly of the copyholder assembly of FIG. 1;

FIG. 7 is an end view of the modular bracket looking in the direction of the arrows 7—7 of FIG. 6;

FIG. 8 is a front elevational view illustrating another way in which the copyholder of the copyholder assembly may be attached to the mounting assembly;

FIG. 9 is a broken front perspective view of the copyholder showing the use of an accessory screen;

FIG. 10 is a fragmentary front perspective view of the copyholder showing the use of an accessory visor;

FIG. 11 is a top plan view of the visor as viewed in the direction of the arrows 11—11 of FIG. 10;

FIG. 12 is a fragmentary section through the visor and copyholder assembly taken substantially along the line 12—12 of FIG. 10;

FIG. 13 is a side elevational view of the mounting assembly showing an accessory table utilized therewith;

FIG. 14 is a section taken substantially along the line 14—14 of FIG. 12;

FIG. 15 is a perspective view of another form of copyholder according to the invention;

FIG. 16 is a front elevational view of still another form of copyholder according to the invention;

FIG. 17 is a fragmentary top plan view of the copyholder of FIG. 16 as viewed in the direction of the arrows 17—17 of FIG. 16;

FIG. 18 is an exploded fragmentary front perspective view illustrating the manner in which the copyholder of FIG. 16 is removably attached to the mounting assembly;

FIG. 19 is a perspective view of another type of mount according to the invention;

FIG. 20 is a perspective view showing other attachment means for attaching the copyholder to the mounting assembly according to the invention;

FIG. 21 is an enlarged vertical section taken substantially along the line 21—21 of FIG. 20; and FIG. 22 is an exploded perspective view showing another form of accessory visor.

DETAILED DESCRIPTION

Referring now in detail to the drawings and initially to FIG. 1, a copyholder assembly according to the invention, indicated generally at 30, is shown mounted to a CRT monitor 31. The copyholder assembly 30 comprises a copyholder 32 which is attached to the front of a mounting assembly 33. As shown, the mounting assembly 33 is supported on and held to the top surface of the monitor housing 34 with a lefthand portion of the copyholder 32 positioned in front of the CRT screen 35 and a righthand portion of the copyholder positioned to one side of the CRT screen.

With additional reference to FIGS. 2–4, the copyholder 32 can be seen to include a display framing panel 40 and a copyholding panel 41. Both panels 40 and 41 are generally planar. The display framing panel 40 has a centrally disposed window 42 of substantially rectangular shape. In the manner discussed hereinafter, the display framing panel 40 can be adjustably positioned in front of the monitor 31 to center the window 42 to the CRT screen 35. The window 42 permits viewing of the screen by an operator whose head is positioned forwardly of the panel 40 and CRT screen 35. The dimensions and specific shape of the window 42 may be selected for a particular screen size and shape or to accommodate a range of screen sizes and shapes. For the most commonly utilized CRT screen having a diagonal dimension of 12 inches, the window opening preferably has a height of about 9 inches and a width of about 12 inches.

When the display framing panel 40 is positioned in front of the monitor as indicated, the copyholding panel 41 will be offset to one side of the CRT screen 35, such offset being to the right in FIG. 1. The copyholding panel 41 is generally of rectangular shape as is the display framing panel 40, and both panels preferably are of the same height. The copyholding panel 41 further is characterized by a front planar surface which functions to support one or more items of copy material which may be held thereto by any suitable means. As seen in FIG. 1, clips 45 are provided along the top edge of the copyholding panel for the purpose of detachably securing copy material 46 to the copyholding panel.

As indicated, the panels 40 and 41 are joined at adjacent sides thereof. As seen in FIGS. 1–4, this is the result of the panels being formed from a single sheet of material with respective end portions of the sheet forming the panels. Although any suitable material may be utilized to form the copyholder, lightweight plastic sheet material is preferred. The plastic sheet material may be opaque but preferably is clear or translucent and may have a smoked tint further to enhance the aesthetically pleasing appearance of the copyholder. As best seen in FIG. 2, the unitary sheet preferably is bent along an intermediate vertical fold line 48 forwardly to angle the copyholder panel 41 out of the plane of the display framing panel 40. This is desirable because it brings the plane of the copyholding panel generally at right angles to the line of sight of an operator whose head is positioned centrally and forwardly of the window 42 of the display framing panel 40. This provides for easy reading of the copy material supported by the copyholding panel and easy eye transition between the copy material and the CRT screen 35. Consequently, the fold line 48 defines the adjacent edges of the panels 40 and 41.

Referring now to the mounting assembly 33, such can be seen in FIGS. 1–4 to include a pair of parallel support brackets 50 and 51, a lever arm 52 and a mounting bracket 53. The mounting bracket 53 is L-shape and has attached to its longer leg 54 the display framing panel 40 of the copyholder 32. The leg 54 may be somewhat shorter than the width of the display framing panel 40 and the attachment is effected by fasteners such as wing nuts 55 and thumb bolts 56. To provide for such attachment, the display framing panel 40 has an elongate horizontal slot 57 in its upper marginal portion defined by the top edge of such panel and the top edge of the window 42. The thumb bolts 56 extend through such slot 57 for receipt in respective holes provided in the leg 54 of the mounting bracket 53. Although respective holes could be provided in the display framing panel 40 for alignment with corresponding holes in the leg 54, the elongate slot 57 is preferred to provide for lateral adjustment of the display framing panel relative to the mounting assembly 33.

In addition to the slot 57, the display framing panel 40 preferably has a similar slot 58 in its lower marginal portion defined between the bottom edge of the panel and the bottom edge of the window 42. This permits alternative inverted attachment of the copyholder 32 to the mounting assembly 33 with the copyholding panel 41 being offset to the left rather than to the right as illustrated. That is, the copyholder may be detached from the mounting bracket 53, rotated 180° and then reattached to the mounting bracket at the slot 58. There also may be provided yet another slot 59 in the marginal portion of the display framing panel defined between the fold line 48 and the adjacent edge of the window 42. The slot 59 permits a further attachment mode of the copyholder with the copyholding panel being offset above the mounting assembly and thus above the CRT screen 35 as seen in FIG. 8. The particular attachment mode may be selected by the operator to suit his/her needs.

The other or short leg of the mounting bracket 53 actually consists of two legs 60 defining therebetween a clevis slot 61. The clevis legs 60 are perpendicular to the leg 54 and are spaced apart to define the clevis slot 61 which receives the front end of the lever arm 52 with a close fit. The clevis legs also have therein respective parallel elongate slots 62 through which a thumb bolt 63 extends. The thumb bolt also passes through a slot 64 in and extending almost the length of the lever arm for pivotal connection of the mounting bracket to the lever arm. The mounting bracket may be pivoted relative to the lever arm angularly to adjust the copyholder 32 in relation to the monitor 31 preferably to bring the display framing panel 40 into substantially parallel relationship with the CRT screen 35 as well as to slightly upwardly tilt the copyholder. The thumb bolt may also slide in the elongate slots 62 in the clevis legs 60 as well as in the slot 64 of the lever arm 52 to permit a substantial amount of forward and rear adjustment of the copyholder relative to the mounting assemby 33 for desired positioning of the copyholder in front of the monitor 31. Once properly positioned, the wing nut 65 threaded on the thumb bolt may be tightened to hold the position of the mounting bracket in relation to the lever arm, or vice versa.

The support brackets 50 and 51 are in similar manner pivotally connected to the lever arm 52 to the rear of the mounting bracket 53 by respective wing nuts 67 and 68 and thumb bolts 69 and 70. The support brackets 50 and 51 preferably are identical in form to the mounting bracket 53 whereby a single mold may be used to form the support and mounting brackets from a suitable structural plastic as is preferred. Accordingly, the support brackets 50 and 51 each includes a long leg and short clevis legs identified by the same reference numerals as the corresponding legs of the mounting bracket 53. As indicated, such brackets are preferably of a molded integral construction best seen in FIGS. 6 and 7.

It also is noted that the slots 62 in the clevis legs 60 of such brackets preferably are closed at their ends as shown to prevent separation of the brackets from the lever arm in the event the connecting fasteners become loose.

The thusly formed connections between the support brackets 50 and 51 and the lever arm 52 provide for substantial universal adjustment of the support brackets relative to the lever arm except to the extent they are precluded from horizontal adjustment at right angles to the linear extent of the lever arm. In relation to the lever arm, the support brackets may be pivoted, raised or lowered, and moved forwardly and rearwardly. This permits the planar bottom surfaces of the long leg 54 of such brackets to be adjustably matched to the top surface contour of different monitors. Once properly adjusted, the fasteners may be tightened to lock the mounting assembly in a fixed arrangement.

As best seen in FIG. 5, the front support bracket 51 may be adjusted for resting support atop the monitor 31 towards the front thereof and the rear support bracket 50 towards the rear of the housing. The front support bracket consequently serves as a fulcrum support with the weight of the suspended copyholder 32 being at least partly counterbalanced by the weight of the rear support bracket 50. Also, the long legs 54 of the support brackets extend in the direction opposite the offset of the copy support panel 41 (FIG. 1) to afford a degree of counterbalance and stability to the overall assembly 20 about its horizontal front to rear axis through its center of gravity. In this regard, it is noted that the lever arm is approximately transversely centered to the copyholder.

With the front support bracket 51 functioning as a transversely elongate fulcrum, there preferably is provided means to hold the rear support bracket 50 against the top surface of the monitor housing 34 to resist lifting forces acting thereon and thus to prevent teetering of the overall assembly 20. As best seen in FIG. 6, velcro strips 72 and 73 or the like respectively including hooks and loops may be employed to detachably hold the rear support bracket 50 to the top surface of the monitor housing 34 to prevent teetering as well as to prevent turning of the mounting assembly on the monitor. The strip 72 is affixed to the flat underside of the long leg 54 of the rear support bracket and the other strip 73 is affixed to the top surface of the monitor housing 34 at the engagement position for the rear support bracket. When engaged, such strips provide a holding force maintaining the mounting assembly in proper position. On the other hand, such strips provide for easy removal of the mounting assembly 33. If desired, the front mounting bracket 51 may be similarly attached to the monitor.

Although velcro strips, pads or the like are preferred expedients, other means may be used to hold the mounting assembly securely against the top of the monitor housing 34 preferably in a manner permitting easy removal of the copyholder assembly 20 when desired by the end user. For example, an elongate elastic strap having hooks at the ends thereof may be used. Such a strap, illustrated in phantom lines at 74 in FIG. 5, may be extended over the mounting assembly 33 to the rear of the front mounting bracket 51 and secured at its hooks at respective sides of the monitor with the strip maintained in a stretched condition. To effect such securement, the hooks for example may be caught under respective bottom side edges of the monitor housing. Another exemplary alternative to the velcro strips is to weight the rear support bracket 50 or rear end of the lever arm 52 to over-counterbalance lifting forces resulting from the weight of the copyholder located forwardly of the front support bracket 51. This latter arrangement makes it even more easy to install the copyholder assembly and remove the same when not needed or when otherwise desired.

A major advantage of the above described copyholder assembly 20 is that it easily may be mounted to a monitor by the end user. Moreover, the assembly may be easily adjusted for use with a large number of different monitors as well as configured in one of several operative modes. Such assembly may be used, for example, with monitors having different top surface contours which may include within the area thereof handles, cooling vents, etc. As will be appreciated, the support brackets may be adjusted towards and away from each other so as not to cover or obstruct cooling vents in the monitor housing. The support brackets may also be pivoted to match sloped surface areas of the monitor's top surface for stable and secure support of the copyholder assembly as seen in FIG. 5.

In FIGS. 9-14, several optional accessories are shown. The accessory seen in FIG. 8 includes a screen or lens 76 attached as by a clip 77 to the display framing panel 40 so as to span the window 42. The screen 76 may be an anti-glare or polarized screen to minimize glare or reflections resulting from lights in the work station area. Another type of screen which may be utilized is one consisting of a lens operative to magnify that which is displayed on the CRT screen. If the utilized screen is relatively flimsy, the unclipped end thereof may be engaged in the vertical slot 59 to hold the screen flat against the display framing panel.

The accessory seen in FIGS. 10-12 includes a visor 78 which may be utilized to prevent glare on the CRT screen from overhead lights. The visor 78 has an opaque brim 79 extending substantially the width of the window 42 and forwardly from the display framing panel 40 at the top thereof. The visor also has at the rear edge of the brim a depending mounting flange 80 which may be clamped between the framing panel 40 and the long leg 54 of the mounting bracket 53 as best seen in FIG. 11. The mounting flange may have slots or apertures 81 aligned with the holes in the long leg 53 of the mounting bracket for passage of the thumb bolts 56 therethrough. Of course, other means may be provided for easy and preferably detachable securement of the visor along the top edge of the display framing panel.

In FIGS. 13 and 14, another accessory can be seen to include a table or platform 84 secured to and supported atop a table support bracket 85. The table support bracket 85 preferably is identical to the mounting and support brackets of the mounting assembly 33. Accordingly, the long leg of the table support bracket 85 is identified by reference numeral 54 and can be seen to extend beneath the table 84. The clevis legs 60 of the table support bracket depend from the long leg 54 for connection to the lever arm 52 which extends through the clevis slot 61 formed between the clevis legs. Adjustable connection between the table support bracket and the lever arm is effected by a wing nut 87 and thumb bolt 88. To provide support for the table at its end opposite the connection to the lever arm, there is secured to the long leg 53 a depending leg 89. Screw threaded into the lower end of the leg 89 is an adjustable foot 90 which may be height adjusted for engagement against the top surface of the monitor housing.

As will be appreciated, the table support bracket 85 may be angularly adjusted with respect to the lever arm 52 to level the table 84. The table also may be adjusted forwardly and rearwardly along the lever arm as well as up and down. The elevated position of the table avoids obstruction of any cooling vents in the top of the monitor housing. As will further be appreciated, the table renders useful the usually unused space above the monitor, even possible for storage of magnetic storage media such as discs because of the substantial space provided between the table and the monitor. The weight of the table also operates to hold the mounting assembly against the top surface of the monitor housing.

In FIG. 15, another form of copyholder is indicated at 93. The copyholder 93 includes a central display framing panel 94 and a pair of copyholding panels 95 extending from respective sides of the display framing panel 94. The copyholder 93 is substantialy the same as the above described copyholder 32 except for the provision of an additional copyholding panel. Accordingly, the display framing panel 94 has a centrally disposed window 96 of substantially rectangular shape and size for viewing therethrough of a CRT screen. The display framing panel also has in its top marginal portion horizontal elongate slots 97 to permit attachment to the mounting assembly 33 in like manner to that discussed above. As illustrated, the copyholder 93 may be formed from a single sheet of material and then desirably bent along intermediate vertical fold lines 98 and 99 forwardly to angle the copyholding panels 95 out of the plane of the display framing panel.

As will be appreciated, the copyholder panel 93 when used in place of the copyholder panel 32 increases the number of items of copy material that may be supported adjacent the CRT screen of the monitor. It also is noted that a modified mounting assembly (not shown) may be provided for preferred use with the copyholder of FIG. 14. In such modified mounting assembly, the brackets thereof preferably have the clevis legs located centrally along the lengths of the respective long legs of such brackets. Accordingly, the brackets then would be generally T-shape with a short stem being formed by the clevis legs. This provides for more stable mounting of the copyholder 93 since the lever arm of such mounting assembly would then be approximately transversely centered to the copyholder 93 with the long legs of the brackets extending horizontally from both sides of the lever arm for more stable support of the copyholder 93.

FIGS. 16-18 show still another form of copyholder indicated generally at 100. Like the copyholder 32, the copyholder 100 includes a display framing panel 101 and a copyholding panel 102. Both panels are generally planar and the display framing panel has a centrally disposed window 103 of substantially rectangular shape.

Unlike the copyholder 32, the display framing panel 101 and copyholding panel 102 of the copyholder 100 are joined together for pivotal or hinged movement about an axis extending parallel to their planar extents. As illustrated, the display framing panel 101 at its side adjacent the copyholding panel 102 has a pair of vertically spaced parallel tabs 105 extending forwardly from and at right angles to the balance of the display framing panel top and bottom a side cut-out in the display framing panel. The copyholding panel at its edge adjacent the display framing panel also has a pair of vertically spaced tabs 106 extending forwardly from and at right angles to the balance thereof inwardly of top and bottom corner cutouts in the copyholding panel. Preferably, the sheet material forming the panels is cut to define the respective tabs which then may be bent at right angles to the respective panels.

For the most part, the herein disclosed copyholders may be cut or stamped from plastic sheet material and then heat formed.

The tabs 106 of the copyholding panel are spaced sufficiently to receive therebetween the spaced tabs 105 of the display framing panel in abutting overlapping relationship. The tabs of each panel are provided with holes that may be aligned for passage therethrough of respective thumb bolts 107. The axes of the bolts 107 are aligned and define a pivot axis about which the copyholding panel may turn for angular adjustment in relation to the display framing panel. When the copyholding panel is adjusted to a desired angular position in relation to the display framing panel, the wing nuts 108 threaded on the thumb bolts may be tightened to fix the position of the copyholding panel. In this manner, the user may adjust the angle of the copyholding panel to suit his/her needs.

It also is noted that the copyholder 100 provides for more compact shipping, packaging and/or storage in a smaller envelope than that which would be needed in connection with the copyholders seen in FIGS. 1 and 6. That is, the copyholding panel 102 may be swung over onto the display framing panel. The copyholder, when folded, may also be used as a convenient clipboard when not attached to the mounting assembly 33 (FIGS. 1-4).

The panels 101 and 102 also may be flipped over when attached to the mounting assembly whereby the hinge tabs will be located to the rear of the panels, if desired. Additionally, only one panel may be flipped over and the hinge tabs reattached whereby one panel will be slightly in front of or behind the plane of the other. With the panels thusly joined and with the plane of one panel spaced further from the pivot axis than the other panel in the opposite direction, relative pivotal movement through 180° may be obtained. The hinge tabs of one panel also may be provided with L-slots or the like to permit detachment of the panels by loosening of the fasteners 107, 108 and without having to disassemble such fasteners, such removal providing, for example, usage of the copyholding panel 102 as a clipboard.

Although the copyholder 100 may be attached to the mounting assembly 33 in like manner to that discussed above in connection with the FIG. 1 embodiment, there is shown in FIGS. 16 and 18 an alternative way to attach the copyholder 100, and also the other above described copyholders, to the mounting assembly. As seen in FIG. 18, the mounting bracket 53 of the mounting assembly is modified to include in the long leg thereof an elongate slot 110. The slot 110 is sized to closely receive a transversely elongate stem portion 111 of a generally T-shape attachment member 112. At its front end face, the stem portion 111 has secured thereto by pivot pins 113 plural transversely spaced locking blocks 114. The locking blocks 114 have a thickness equal to or less than the thickness of the stem portion whereby when rotated into the plane of the stem portion as seen in FIG. 18, such locking blocks can pass through the slot 110 in the mounting bracket as well as through the slot 115 provided in the upper marginal portion of the display framing panel 101. The stem portion of the attachment member extends from a rear flange portion 116 a distance about equal the combined thicknesses of the mounting bracket leg 54 and display framing panel 101 when juxtaposed. Upon full insertion of the attachment member into the slots in the mounting bracket and display framing panel bringing the flange portion into abutment with the rear surface of the mounting bracket leg, the locking blocks will be located forwardly of the display framing panel. The locking blocks then may be rotated about the axis of respective pivot pins to move their longer dimension out of the plane of the slots thereby to hold the display framing panel to the mounting bracket. Preferably, the attachment member is fixedly secured to the mounting bracket thereby to eliminate the need to hold the same during attachment or removal of the copyholder.

The slot 115 in the display mounting panel may have a length greater than that of the stem portion of the attachment member to provide for lateral adjustment of the display framing panel 101 relative to the mounting bracket 53. The display framing panel also may be provided with a second elongate slot 119 in its lower marginal portion for inverted mounting of the copyholder 100 to the mounting assembly with the copyholding panel 102 then located at the left of the display framing panel rather than at the right as seen in FIG. 16.

As seen in FIGS. 16 and 17, the copyholding panel 102 may have its top and bottom edges forwardly and inwardly turned upon themselves to provide small lips 112 against which copy material may abut when supported against the front surface of the copyholding panel.

In FIG. 19, an alternative mount for any of the above described copyholders is indicated at 124. The mount is generally L-shape and has a planar rearwardly extending base portion 125 and planar copyholder attachment portion 126 extending upwardly from the front edge of the base portion. The attachment portion is provided with transversely spaced vertical slots 127 for mounting a copyholder such as the copyholder 32 seen in FIG. 1, but at the bottom slot 58 in the display framing panel 40 rather than at the top slot 57. Otherwise, removable attachment of the copyholder to the attachment portion of the mount may be effected in similar manner by suitable fasteners 128 such as wing nuts and thumb screws, the latter extending through the bottom slot 58 in the display framing panel and respective vertical slots in the attachment portion. Lateral adjustment of the copyholder relative to the mount is permitted by the slot 58 in the display framing panel and vertical adjustment by the vertical slots 127 in the attachment portion 125 of the mount. Accordingly, the lower marginal portion of the display framing panel will overlap and be clamped to the attachment portion with the window 42 located above the attachment portion and the copyholding panel of the copyholder to one side of the mount.

The mount 124 is utilized by positioning the base portion 125 thereof beneath the monitor 31 and atop the surface intended to support the monitor at the work station. Accordingly, the weight of the monitor operates to hold the mount in position with the attachment portion 125 extending upwardly in front of the lower portion of the monitor. The display framing panel 40 then will be located in front of the monitor and the window 42 therein may be centered to the CRT screen 35 of the monitor by lateral and vertical adjustment of the copyholder relative to the mount. As is preferred, the included angle between the attachment portion and the base portion of the mount preferably is slightly less than 90° to provide a slight rearward tilt to the copyholder which is generally held upright by the mount.

As seen in FIGS. 20 and 21, removable and simplified attachment of the copyholder 32, or any of the other herein disclosed copyholders, may be effected by a tubular clip 130. The clip 130 may be formed from the same material as the copyholder and preferably from otherwise scrap material cut from the copyholder to form the window 42. It is noted that the clip 130 and mounting arm 53 have been somewhat dimensionally exaggerated in relation to the copyholder for illustrative purposes.

The clip 130 has an inner rear wall portion 132, a bottom edge wall portion 133, a front wall portion 134, a top edge wall portion 135, and an outer rear wall portion 136. The height of the inner rear wall portion 132 is substantially equal the height of the upper marginal portion of the display framing panel 40 of the copyholder 32. Together, the inner rear wall portion 132, the bottom edge wall portion 133 and lower portion of the front wall portion 134 define an open ended socket 137 for close fitted receipt of the upper marginal portion of the display framing panel. As seen in FIG. 20, the width of the clip 130 is less than that of the window 42 to allow for such fitted receipt.

Above and in communication with the socket 137, another open ended socket 139 is formed by the top edge wall portion 135 and the coextensive upper portions of the front wall portion 134 and outer rear wall portion 136. The upper socket 139 is dimensioned for close fitted receipt of the long leg 54 of the mounting arm 53. As seen in FIG. 21, the outer rear wall portion 136 extends downwardly outwardly to overlap the inner rear wall portion 132.

The clip 130 is sufficiently flexible to allow the outer rear wall portion 136 to be pulled sufficiently away from the inner rear wall portion 132 to permit passage of the upper marginal portion of the display framing panel 40 between such wall portions and into the upper socket 139. Once clear of the inner rear wall portion, the upper marginal portion of the display framing panel is fitted into the lower socket 137. Preferably there is a friction fit to hold the clip in place on the display framing panel.

With the clip 130 thusly attached to the display framing panel, the clip may be slid onto the mounting arm 53 with the long leg 54 thereof passing end-wise through the upper socket 139 of the clip. As needed, the copyholder may be adjusted laterally by adjustably sliding the clip 130 on the mounting arm or the clip relative to the display framing panel. As will be appreciated, the illustrated manner of attachment permits easy and quick attachment or removal of the copyholder from the mounting arm 53 which may remain in secured relation to the monitor.

To position the copyholding panel 41 at the left of the display framing panel 40 rather than the right as shown, the clip need only be similarly clipped onto the lower marginal portion of the display framing panel, which marginal portion will become the upper marginal portion when the copyholder is inverted.

It is noted that the clip 130 serves to define a tubular socket or receptacle for the mounting arm 53. Such a socket may otherwise be formed and located to the front or rear of the upper marginal portion of the display framing panel 40 rather than above as in the case of the clip 130. For example, such a socket may be formed integrally with the display framing panel or attached as by an adhesive. Sockets may also be provided at both the upper and lower marginal portion of the display framing panel with one being forwardly of the respective marginal portion and the other to the rear to provide for alternative inverted attachment of the copyholder to the mounting arm. Attachment of the copyholder also may be effected by one or more and preferably two C-clips operative to snap over the long leg of the mounting arm with the upper marginal portion of the display framing panel received in the bight of each clip and held tightly against the front face of the mounting arm.

Turning now to FIG. 22, there is shown another type of accessory visor 145. The visor 145 has an opaque brim portion 146 and opaque side portions 147 depending from respective sides of the brim portions. The side portions 147 each include a vertical slot 148 for slip fit onto the upper marginal portion of the display framing panel 40 as indicated. The side portions 147 are sufficiently spaced apart to accommodate therebetween the mounting arm 53 to which the display framing panel may be attached.

In view of the foregoing, it can now be seen that a copyholder and assembly according to the invention provides for support of copy material directly adjacent the CRT screen of a video monitor at a desired inclination and without the need for a consumption of task surface space. This minimizes eye and head movements of the operator for higher productivity and less fatigue. It also greatly facilitates error free and more rapid transcription of data and/or text to the CRT screen. The copyholder and assembly may be used with many different types of monitors and without permanent modification to the monitor. The copyholder and assembly, which is inexpensive to manufacture, also may be easily adjusted to the monitor as well as easily removed from the monitor for storage or use at another work station.

In general, the several copyholder assemblies herein disclosed are generally of L-shape or inverted L-shape when viewed from the side with the vertical leg being formed by the copyholder and the horizontal leg by the mounting assembly.

Although the invention has been described with respect to exemplary embodiments thereof, it will be understood that alterations and modifications can be effected in the embodiment without departing from the scope or spirit of the invention. The present invention includes all such equivalent alterations and modifications, and is limited only by the scope of the following claims.

I claim:

1. In combination, a CRT monitor including a CRT screen and a housing; a copyholder including a display framing panel of generally rectangular shape and formed from sheet material, said display framing panel having formed therein a window generally corresponding in size and shape to said CRT screen, and a copyholding panel of generally rectangular shape joined along a side thereof to an adjacent side of said display framing panel for extension from said adjacent side of said display framing panel, said copyholding panel being formed from sheet material and having front copy support surface means for supporting copy thereon; and means for mounting said copyholder with respect to said housing of said monitor with said window of said display framing panel positioned in front of and generally parallel to said CRT screen to permit viewing of said screen through said window.

2. A combination as set forth in claim 1, wherein said panels are formed from a single sheet of material.

3. A combination as set forth in claim 2, wherein said window is generally rectangular and said single sheet of material is bent along a line generally parallel to a side of said window to define at respective sides of said line said display framing panel and said copyholding panel.

4. A combination as set forth in claim 1, further comprising means for holding copy material to said copyholding panel.

5. A combination as set forth in claim 4, wherein said means for holding includes at least one clip.

6. A combination as set forth in claim 1, wherein said display framing panel has at least one elongate slot in a marginal portion thereof, which marginal portion is defined between a side of said window and an adjacent side edge of said display framing panel.

7. A combination as set forth in claim 1, wherein said copyholding panel has at least one edge thereof bent out of the plane thereof to form a lip against which copy material may abut when supported on said copy support surface means.

8. A combination as set forth in claim 1, further comprising a second copyholding panel joined to said display framing panel opposite said first mentioned copyholding panel, said second copyholding panel having a respective front copy support surface means for supporting copy thereon.

9. A combination as set forth in claim 1, wherein said panels are connected for relative pivotal movement about an axis generally parallel to the planar extents thereof, and means are provided adjustably to hold said panels in a desired angular relationship.

10. A combination as set forth in claim 9, wherein said panels at adjacent sides thereof each have top and bottom tabs extending out of their respective planes, said top and bottom tabs of each panel overlapping corresponding tabs of the other panel for pivotal connection.

11. A combination as set forth in claim 1, wherein said means for mounting includes support means for supporting said copyholder in suspended relation to a support surface for said monitor with said window positioned in front of said CRT screen.

12. A combination as set forth in claim 11, wherein said support means is mounted atop said housing of said monitor.

13. A combination as set forth in claim 12, wherein said support means includes a lever arm, mounting bracket means for securing said display framing panel to said lever arm at a front end thereof, and front and rear mounting bracket means connected to said lever arm and engageable with a top surface of said housing of said monitor for supporting said lever arm in relation to said monitor.

14. A combination as set forth in claim 11, further comprising means for removably and adjustably attaching said display framing panel to said support means.

15. A combination as set forth in claim 1, further comprising optic means removably attachable to said display framing panel with said optic means spanning said window.

16. A combination as set forth in claim 15, wherein said optic means is an anti-glare screen.

17. A combination as set forth in claim 1, further comprising a visor removably attachable at the top edge of said display framing panel.

18. A combination as set forth in claim 1, wherein said means for mounting includes a mount supported atop said housing of said monitor and means for securing said display framing panel to the front of said mount for depending suspension of said display framing panel in front of said CRT screen.

19. A combination as set forth in claim 18, wherein said mount includes plural support members engaging a top surface of said housing of said monitor, and adjustable means for adjusting said support members to the contour of said top surface of said housing.

20. A combination as set forth in claim 19, wherein said plural support members include a front support member and a rear support member respectively engageable with front and rear portions of said top surface of said housing, said front support member being operable as a fulcrum and said rear support member being operable at least partly to counter-balance the weight of said copyholder.

21. A combination as set forth in claim 20, further comprising means releasably to hold said rear support member against the top surface of said housing.

22. A combination as set forth in claim 21, wherein said means to hold includes hook means and loop means, one affixed to said rear support member and the other affixed to the top surface of said housing.

23. A combination as set forth in claim 20, wherein said mount further includes a rearwardly extending arm to which said support members are connected, and a mounting member connected to said arm at its front end, said copyholder being connected to said mounting member by said means for securing.

24. A combination as set forth in claim 23, wherein said mounting member and said support members are connected to said arm for pivotal and linear adjustment.

25. A combination as set forth in claim 23, wherein said mounting member and said support members are identical components.

26. A combination as set forth in claim 23, wherein said support members each include parallel legs defining a clevis slot for receipt of said arm, said legs and said arm each including respective elongate slots, and further comprising fastener means extending through the slots in respective legs and said slot in said arm for fixedly yet adjustably securing said legs to said arm.

27. A combination as set forth in claim 18, further comprising means secured to said mount for providing a table support surface spaced above said mount.

28. A combination as set forth in claim 18, wherein said mount has a planar base portion supporting said monitor thereon and a generally upright attachment portion joined to said base portion at the front thereof, said copyholder being attachable at a lower portion thereof to said attachment portion by said means for securing.

29. A combination as set forth in claim 18, wherein said mount includes a horizontal mounting arm and said means for securing includes horizontal socket means on said copyholder for slidably receiving said mounting arm.

30. A combination as set forth in claim 29, wherein said socket means is formed by a clip detachable from said copyholder.

* * * * *